(12) United States Patent
Fujii et al.

(10) Patent No.: US 10,502,812 B2
(45) Date of Patent: Dec. 10, 2019

(54) MOVABLE BODY WHICH ALLOWS DETECTION OF AXIAL DEVIATION OF AXIS OF SURROUNDINGS DETECTOR

(71) Applicant: HONDA MOTOR CO., LTD, Tokyo (JP)

(72) Inventors: Satoshi Fujii, Wako (JP); Haruhiko Nishiguchi, Wako (JP); Daisuke Kubota, Wako (JP); Ryohsaku Arakawa, Wako (JP); Idhsada Sanguanwongthong, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 15/596,342

(22) Filed: May 16, 2017

(65) Prior Publication Data
US 2017/0336496 A1    Nov. 23, 2017

(30) Foreign Application Priority Data

May 17, 2016  (JP) .................................. 2016-098843

(51) Int. Cl.
*G01S 7/40*    (2006.01)
*G01S 13/04*   (2006.01)
(Continued)

(52) U.S. Cl.
CPC .......... *G01S 7/4026* (2013.01); *G01S 7/4008* (2013.01); *G01S 7/4052* (2013.01); *G01S 13/04* (2013.01);
(Continued)

(58) Field of Classification Search
CPC ................. G01S 13/931; G01S 7/4026; G01S 2007/403; G01S 2007/406;
(Continued)

(56) References Cited

U.S. PATENT DOCUMENTS 6,778,131 B2 *  8/2004  Haney ................... G01S 7/4026
                                                    342/165
6,828,931 B2 * 12/2004  Kikuchi ................ G01S 7/4026
                                                    342/174
(Continued)

FOREIGN PATENT DOCUMENTS

JP        61-40579 A     2/1986
JP      2003-35768 A     2/2003
(Continued)

OTHER PUBLICATIONS

Office Action dated Nov. 14, 2017, issued in counterpart Japanese Application No. 2016-098843, with English machine translation. (6 pages).

*Primary Examiner* — Marcus E Windrich
(74) *Attorney, Agent, or Firm* — Westerman, Hattori, Daniels & Adrian, LLP

(57) ABSTRACT

A marker used to detect an axial deviation of a radio wave axis Ar of a radar unit is provided in front of the radar unit and outside a radar field of view range set based on a field of view angle θ of the radar unit on a vehicle. A relative position between the radar unit and the marker is different between before and after an axial deviation of the radio wave axis Ar of the radar unit occurs. Thus, an axial deviation (an amount Δθ of axial deviation in an azimuth direction and an amount Δα of axial deviation in an elevation angle direction) of the radio wave axis Ar of the radar unit can be detected by obtaining a difference in marker detection position before and after the axial deviation by the radar unit.

9 Claims, 8 Drawing Sheets

(51) Int. Cl.
*G01S 13/86* (2006.01)
*G01S 13/93* (2006.01)

(52) U.S. Cl.
CPC ........... *G01S 13/931* (2013.01); *G01S 13/867* (2013.01); *G01S 2007/403* (2013.01); *G01S 2007/4034* (2013.01); *G01S 2007/4078* (2013.01); *G01S 2013/9375* (2013.01); *G01S 2013/9389* (2013.01)

(58) Field of Classification Search
CPC ..... G01S 2007/4082; G01S 2007/4086; G01S 2007/4091
USPC ........................................................ 342/174
See application file for complete search history.

(56) References Cited

U.S. PATENT DOCUMENTS

| | | | |
|---|---|---|---|
| 7,710,312 B2 * | 5/2010 | Kato ........................ | G01S 7/034 342/175 |
| 9,705,189 B2 * | 7/2017 | Weber ................... | G01S 7/4026 |
| 2010/0237655 A1 * | 9/2010 | Mehs ................... | B60Q 1/0683 296/187.01 |
| 2018/0321378 A1 * | 11/2018 | Sudhakar .............. | G01S 7/4026 |

FOREIGN PATENT DOCUMENTS

| | | | |
|---|---|---|---|
| JP | 2003-149343 A | | 5/2003 |
| JP | 2003149343 A | * | 5/2003 |
| JP | 2004-361279 A | | 12/2004 |
| JP | 2006-47140 A | | 2/2006 |

\* cited by examiner

FIG. 2
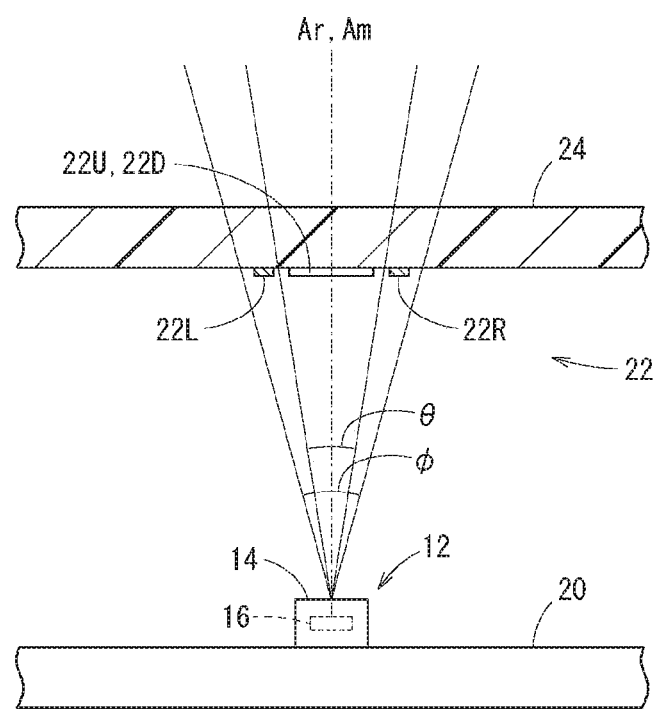
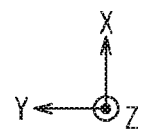

MOVABLE BODY WHICH ALLOWS DETECTION OF AXIAL DEVIATION OF AXIS OF SURROUNDINGS DETECTOR

CROSS REFERENCES TO RELATED APPLICATIONS

The present application claims priority under 35 U.S.C. § 119 to Japanese Patent Application No. 2016-098843, filed May 17, 2016, entitled "Movable Body." The contents of this application are incorporated herein by reference in their entirety.

TECHNICAL FIELD

The present disclosure relates to a movable body including a surroundings detector which detects an object (target) present around the movable body. The surroundings detector is, for example, a camera or a radar, and the movable body is, for example, a vehicle, a ship, or a flight vehicle.

BACKGROUND

For example, Japanese Unexamined Patent Application Publication No. 2004-361279 discloses a radar sensor system in which a transmission section and a reception section for radar waves are arranged in a closed space formed between a vehicle body and a radio wave transmissive member (bumper) provided at a vehicle (paragraph [0020] and FIG. 3 of Japanese Unexamined Patent Application Publication No. 2004-361279).

SUMMARY

For example, a vehicle having a radar unit attached to the front side as in Japanese Unexamined Patent Application Publication No. 2004-361279 may be lightly struck from behind by a different vehicle or may bump lightly into an obstacle (for example, a cliff, a wall, or a utility pole) while backing. That is, a minor rear-end collision (rear surface contact) may occur.

In such a case, a radio wave axis (also referred to as a central axis for radio waves or a sensing axis) of the radar unit attached to the front side of the vehicle may deviate. Deviation of the radio wave axis of the radar unit changes a field of view range (direction) to be detected by the radar unit and causes a position error, a direction error, or the like.

There has been no established technique for sensing an axial deviation.

As disclosed in Japanese Unexamined Patent Application Publication No. 2004-361279, a radar wave transmitted from a radar unit provided at the front of a vehicle is sent out through the above-described radio wave transmissive member that transmits the radar wave while preventing deposition of dust or the like on the radar unit, and the radar wave reflected from a target is received by the radar unit via the radio wave transmissive member.

In this case, since even the radio wave transmissive member attenuates a radio wave by a predetermined amount, a transmitted radio wave and a received radio wave need to be calibrated in advance by amounts corresponding to the predetermined attenuation amount.

If a position deviation occurs between a radio wave axis of radar waves generated from the radar unit and the radio wave transmissive member, the calibration amounts need to be corrected. Japanese Unexamined Patent Application Publication No. 2004-361279, however, makes no reference to this respect.

Note that an optical axis as an axis of a camera unit which picks up an image of, for example, a scene in front of a vehicle, other than a radar unit, may deviate due to a minor collision. In this case as well, calibration that corrects the optical axis is necessary for an image signal. However, there has been no established technique for sensing an axial deviation.

The present application has been made in view of the above-described problems and describes provision of a movable body which allows detection of an axial deviation of an axis (an optical axis and/or a radio wave axis) of a surroundings detector, such as a camera or a radar.

A movable body according to the present application includes a surroundings detector that is attached to a predetermined part of the movable body and detects an object present in a predetermined region around the movable body with a predetermined field of view angle having an axis as a center, and a marker that is provided in front of the surroundings detector as viewed from the surroundings detector and outside a field of view range set based on the field of view angle on the movable body and is used to detect an axial deviation of the axis of the surroundings detector.

Accordingly, for example, the marker for detection of the axial deviation of the axis of the surroundings detector is provided in front of the surroundings detector and outside the field of view range set based on the field of view angle of the surroundings detector on the movable body.

The axis may be, for example, an optical axis if the surroundings detector is a camera unit and may be, for example, a radio wave axis (a central axis for radio waves) if the surroundings detector is a radar unit.

Since a relative position between the surroundings detector and the marker is different between before and after the axial deviation of the axis of the surroundings detector, the axial deviation of the axis of the surroundings detector can be detected by obtaining a difference in marker detection position before and after the axial deviation using the surroundings detector.

In this case, it is preferable that, if the surroundings detector is a radar unit, the axis is a radio wave axis, the movable body further includes a radio wave transmissive member that is attached in front of the radar unit as viewed from the radar unit and to a different predetermined part of the movable body, and the marker that is composed of a high radio-wave-reflecting member is provided outside the field of view range set based on the field of view angle on the radio wave transmissive member and within a limit sensing range of the radar unit.

Accordingly, for example, the marker that is composed of the high radio-wave-reflecting member is provided outside the field of view range set based on the field of view angle of the radar unit on the radio wave transmissive member. For this reason, a position of the marker composed of the high radio-wave-reflecting member provided on the radio wave transmissive member can be easily detected by the radar unit on the basis of a difference in amplitude among radio wave reflected signals (reflected signals) from the radio wave transmissive member and the high radio-wave-reflecting member, and the axial deviation of the radio wave axis of the radar unit from the marker can be detected with high accuracy.

Note that the radio wave transmissive member may be a resin bumper or a resin grille.

The high radio-wave-reflecting member is preferably formed of a metal material outside the field of view range.

The metal material reflects a radar wave. If a reflected signal from the marker composed of the high radio-wave-reflecting member is detected within the field of view range of the radar unit, the axial deviation between the radio wave axis of the radar unit and a marker axis of the marker can be detected on the basis of a position where the reflected signal is detected.

Note that the high radio-wave-reflecting member may be formed in the shape of an elongated line, and that radio wave absorption members may be provided on two sides of the line as viewed from the radar unit.

Signal level of a leading edge and a trailing edge of a reflected signal from the high radio-wave-reflecting member is lower than signal level of a reflected signal from the radio wave transmissive member due to the radio wave absorption members. When a vicinity of the high radio-wave-reflecting member enters the field of view range, a reflected signal from the marker composed of the high radio-wave-reflecting member can be more easily detected on the basis of amplitude of signal level of a reflected signal.

In this case, the marker preferably includes a plurality of markers that are provided on the radio wave transmissive member.

The axial deviation of the radio wave axis of the radar unit can be more accurately calibrated on the basis of a plurality of corresponding reflected signals from the plurality of markers, each composed of the high radio-wave-reflecting member.

In this case, it is preferable that the movable body further includes an axial deviation amount calculation section that calculates the amount of axial deviation between a marker axis as a central axis of a marker field of view range and the radio wave axis, the marker field of view range being formed by the plurality of markers provided on the radio wave transmissive member, the plurality of markers being provided so as to surround the radio wave axis of the radar unit, a transmittance calculation section that calculates transmittance of the radio wave transmissive member on the basis of the amount of axial deviation between the marker axis and the radio wave axis, and a calibration section that calibrates the amount of axial deviation of the radio wave axis and calibrates the transmittance, on the basis of the calculated amount of axial deviation.

The amount of deviation in an azimuth angle in a horizontal direction and the amount of deviation in an elevation angle in a vertical direction of the radio wave axis can be calibrated on the basis of the amount of axial deviation, and the transmittance of the radio wave transmissive member can be calibrated on the basis of the amount of axial deviation.

Note that the movable body preferably further includes a stop section that stops the radar unit from detecting the different object if calculation of the amount of axial deviation is unsuccessful or if calibration by the calibration section falls outside a calibratable range. False detection can be thereby inhibited.

BRIEF DESCRIPTION OF THE DRAWINGS

The advantages of the disclosure will become apparent in the following description taken in conjunction with the following drawings.

FIG. 2 is a partially omitted plan view showing the positional relationship between the radar unit attached to the movable body in the example in FIG. 1 and markers, and the like.

DETAILED DESCRIPTION

A preferred embodiment for a movable body according to the present disclosure will be described below with reference to the accompanying drawings.

[Configuration of Movable Body]

FIG. 2 is a partially omitted plan view showing the positional relationship between a radar unit 12 which is attached to a vehicle 10 (FIG. 1) as a movable body according to the present embodiment and markers 22 which are used to detect an axial deviation of a radio wave axis (a central axis for radio waves) Ar of a radar head 14 of the radar unit 12.

Figure 1:
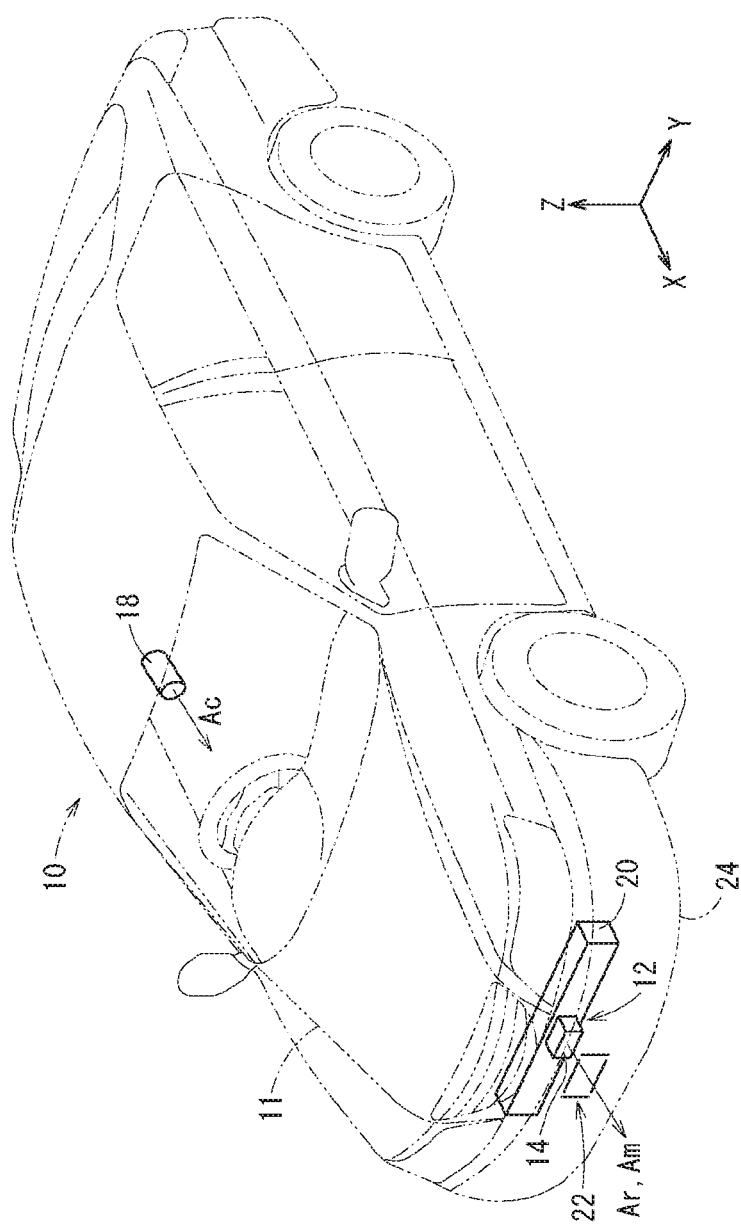
FIG. 1 is a schematic perspective view of a movable body according to an embodiment in which a radar unit and a camera are attached as surroundings detectors.

FIG. 1 is a schematic perspective view of the vehicle 10, to which a camera 18 having an optical axis Ac is attached in addition to the radar unit 12 having the radio wave axis Ar and the markers 22.

Figure 3:
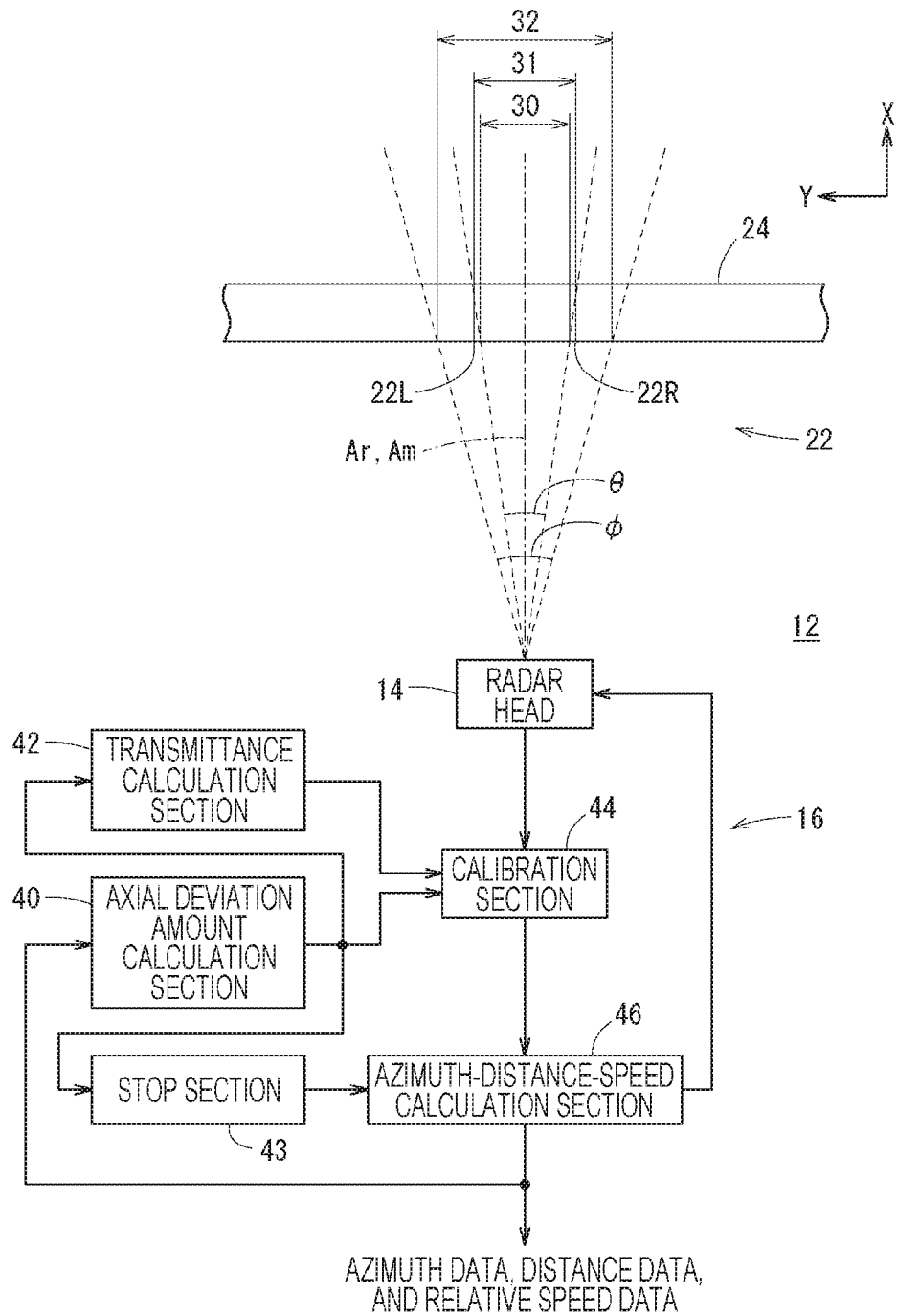
FIG. 3 is a block diagram showing the schematic configuration of the radar unit shown in FIGS. 1 and 2.

FIG. 3 is a block diagram showing the schematic configuration of the radar unit 12. The radar unit 12 is composed of the radar head 14 that includes a flat-shaped transmitting and receiving antenna (not shown) and a signal processing section 16.

In FIGS. 1 to 3, a front-back (X) direction (vehicle length direction), a lateral (Y) direction (vehicle width direction), and a vertical (Z) direction (vehicle height direction) of the vehicle 10 are illustrated with directions of arrows orthogonal to one another.

As shown in FIG. 1, the camera 18 is attached at an upper portion of a front windshield in a vehicle 10 interior such that the optical axis Ac faces the front (the X direction) of the vehicle 10.

The radar unit 12 is attached to a lower cross frame 20 (which is a part of a main frame; hereinafter simply referred to as a frame) on the front side of the vehicle 10 via a bracket (not shown) or the like such that the radio wave axis Ar of the radar head 14 faces the front (the X direction) of the vehicle 10. As shown in FIG. 2, the signal processing section 16 is disposed inside the radar unit 12.

A radio wave transmissive member 24 as a resin bumper which is attached to a vehicle body 11 is disposed in front of the radar unit 12 as viewed from the radar unit 12.

Figure 4:
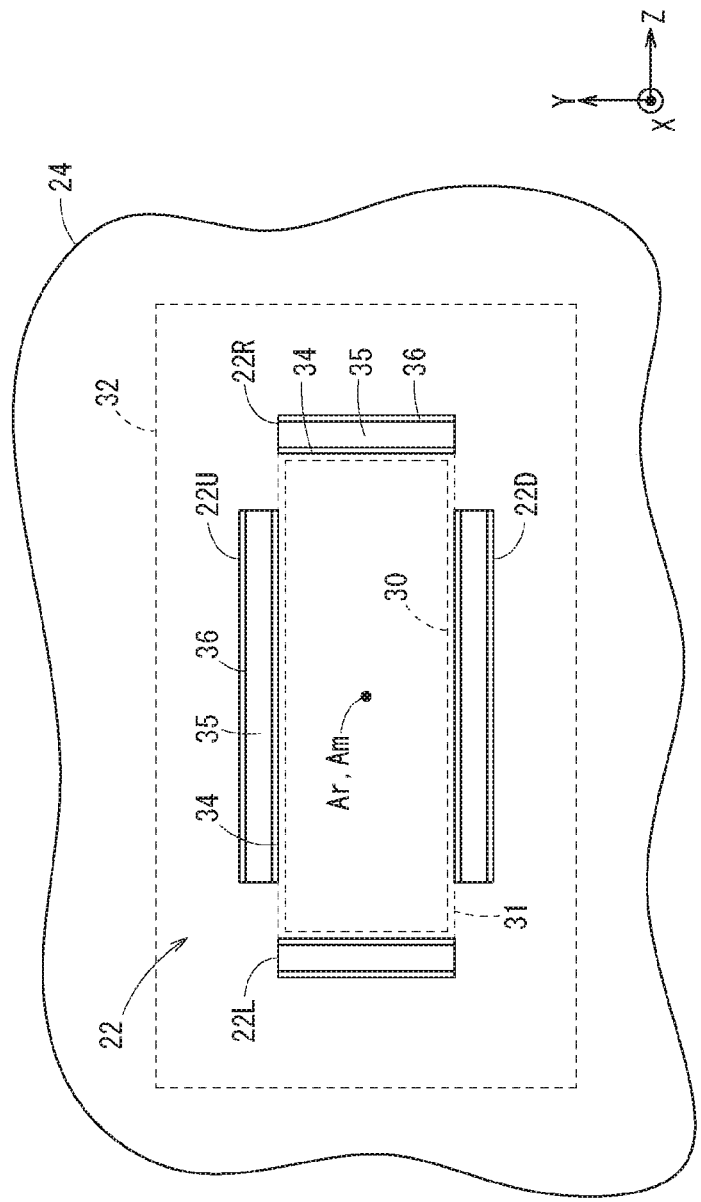
FIG. 4 is a view for explaining a radio wave axis, a marker axis, a radar field of view range, and the like when the markers are viewed from the radar unit.

As shown in FIG. 4 (see also FIG. 2), linear markers 22, each having a high radio-wave-reflecting member 35, are provided in the shape of a rectangle outside a radar field of view range 30 schematically indicated by a dashed quadrangular box and inside a radar limit sensing range 32 schematically indicated by a dashed quadrangular box, on the radar unit 12 side of the radio wave transmissive member 24 (a reverse face of the radio wave transmissive member 24). A member made of a metal, such as aluminum, copper, gold, or an alloy, is used as the high radio-wave-reflecting member 35. Note that the marker 22 may be formed of painted metal or metal tape.

The markers 22 are composed of a right marker 22R, a left marker 22L, an upper marker 22U, and a lower marker 22D which are disposed along and in parallel to respective sides of the quadrangular radar field of view range 30.

More specifically, the markers 22R, 22L, 22U, and 22D are each formed such that the high radio-wave-reflecting member 35 at the center is formed in the shape of an elongated line and such that radio wave absorption members 34 and 36 of, for example, ferrite are provided on two sides of the line as viewed from the radar unit 12 side. The markers 22R, 22L, 22U, and 22D are each formed to be striped (like a sandwich).

The radar field of view range 30 is adjusted in advance so as to be geometrically similar to and be in agreement in shape with a range (referred to as a marker field of view range 31) indicated by a virtual box which is composed of a quadrangle inscribed in the markers 22R, 22L, 22U, and 22D (the adjustment is referred to as zero adjustment). Note that the radar field of view range 30 may be identical to the marker field of view range 31.

After the zero adjustment, an axis orthogonal to the quadrangular marker field of view range 31 at the center (referred to as a marker axis Am) and the radio wave axis Ar agree in direction and position. In a state where the marker axis Am and the radio wave axis Ar are in agreement, there is no axial deviation, and the amount of axial deviation has a zero value.

Note that although the radar unit 12 is provided at the lower cross frame of the frame 20 on the front side of the vehicle 10 in the present embodiment, the radar unit 12 may be provided at, for example, an upper cross frame (not shown) of the frame 20 on the front side of the vehicle 10. If the radar unit 12 is provided at the upper cross frame, the markers 22 may be provided at, for example, respective sides of a quadrangular resin emblem which is disposed at a resin front grille in front of the upper cross frame.

As shown in FIGS. 2 and 3, the radar unit 12 detects, as an obstacle, an object present in a predetermined region of surroundings within a predetermined azimuth angle range (an angle θ of field of view) and a predetermined elevation angle range (not shown) having the radio wave axis Ar of the radar head 14 as centers. For the sake of brevity, the predetermined azimuth angle range (the angle θ of field of view) will be described below as an example.

Note that, as described above, the radar limit sensing range 32 (FIG. 3) that is a maximum field of view range of the radar unit 12 is drawn as a limit sensing angle (limit angle of field of view) φ in FIGS. 2, 3, and 4.

In actuality, the radar field of view range 30 and the radar limit sensing range 32 are not complete rectangles and are near-elliptical. The radar field of view range 30 and the radar limit sensing range 32 are drawn as rectangles here for ease of comprehension.

As described above with reference to FIG. 3, the radar unit 12 is composed of the radar head 14 and the signal processing section 16. The signal processing section 16 is composed of an electronic control unit (ECU).

A CPU (not shown) of the signal processing section 16 can implement functions of an axial deviation amount calculation section 40, a transmittance calculation section 42, a stop unit 43, a calibration section 44, and an azimuth-distance-speed calculation section 46 by reading out a program from a memory (not shown) and executing the program. The functions can also be implemented by hardware such as circuitry. Note that specific functions of the respective sections will be described later.

[Operation of Movable Body]

The operation of calculating the amount of axial deviation of the radio wave axis Ar of the radar unit 12 in the vehicle 10 that is a movable body basically configured in the above-described manner will be described below with reference to the flowchart in FIG. 5. Note that an execution entity of a program associated with the flowchart is the signal processing section 16.

Figure 5:
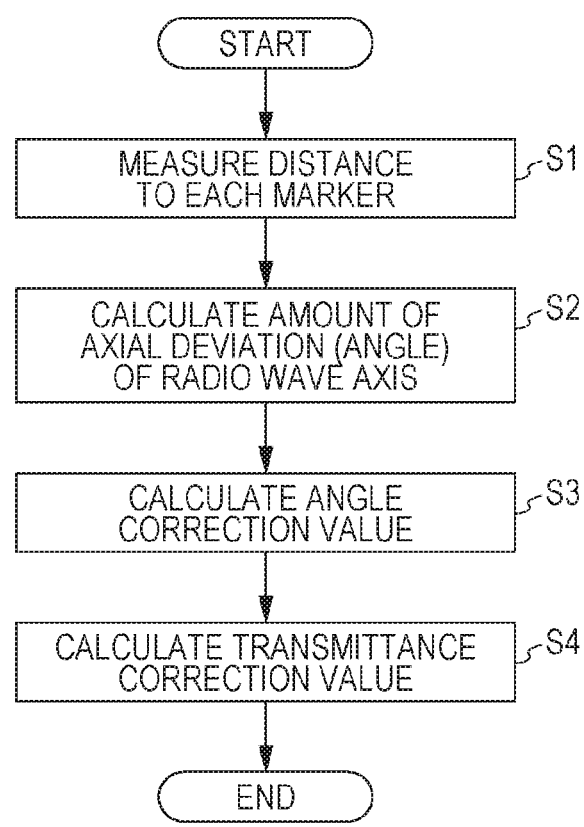
FIG. 5 is a flowchart used to explain the operation of the radar unit that includes a process of calculating the amount of axial deviation of the radar unit.

The flowchart in FIG. 5 is executed, for example, at a time when a power switch of the vehicle 10 is turned on or immediately after the vehicle 10 senses a collision with a collision sensor (not shown) and stops. Note that the flowchart may be executed all the time.

As described above, for example, if the vehicle 10 with the radar unit 12 attached to the front side is lightly struck from behind by a different vehicle or if the vehicle 10 bumps lightly into an obstacle (for example, a cliff, a wall, or a utility pole), that is, a minor collision occurs while reversing, the radio wave axis Ar of the radar unit 12 may deviate. Note that, even in the event of a minor floor collision or lateral collision, the radio wave axis Ar may deviate.

As shown in FIG. 4, at the time of shipment of the vehicle 10, the radio wave axis Ar and the marker axis Am agree, and the radar field of view range 30 and the marker field of view range 31 are geometrically similar and are in agreement in shape (opposing sides are parallel without crossing each other).

Figure 6:
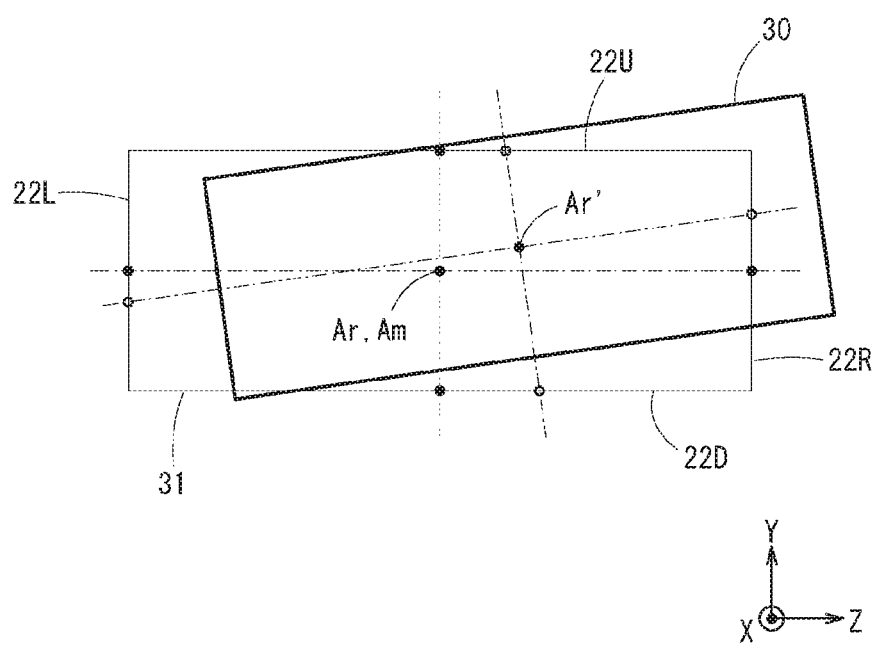
FIG. 6 is an explanatory view used to explain a process of calculating the amount of axial deviation of the radio wave axis from the marker axis.

FIG. 6 shows a state where the radio wave axis Ar in agreement with the marker axis Am suffers from an axial deviation due to, for example, a minor collision and changes to a radio wave axis Ar' after axial deviation. The radar field of view range 30 deviates from the marker field of view range 31.

In step S1, the axial deviation amount calculation section 40 drives the radar unit 12 via the azimuth-distance-speed calculation section 46 and scans the radar field of view range 30 with the axial deviation shown in FIG. 6. The axial deviation amount calculation section 40 uses the radio wave axis Ar' after axial deviation as an origin to measure linear distances from the origin to the markers 22U, 22D, 22L, and 22R indicated by circles (white circles) and measures linear distances from the radar head 14 to the markers 22U, 22D, 22L, and 22R.

In step S2, the axial deviation amount calculation section 40 calculates the amount of axial deviation of the radio wave axis Ar' from the marker axis Am. In this case, linear distances from the marker axis Am before occurrence of the axial deviation as an origin to the markers 22U, 22D, 22L, and 22R indicated by dots and the linear distances from the radar head 14 to the markers 22U, 22D, 22L, and 22R are already known, and the amount of axial deviation between the marker axis Am and the radio wave axis Ar' can be calculated.

Figure 7:
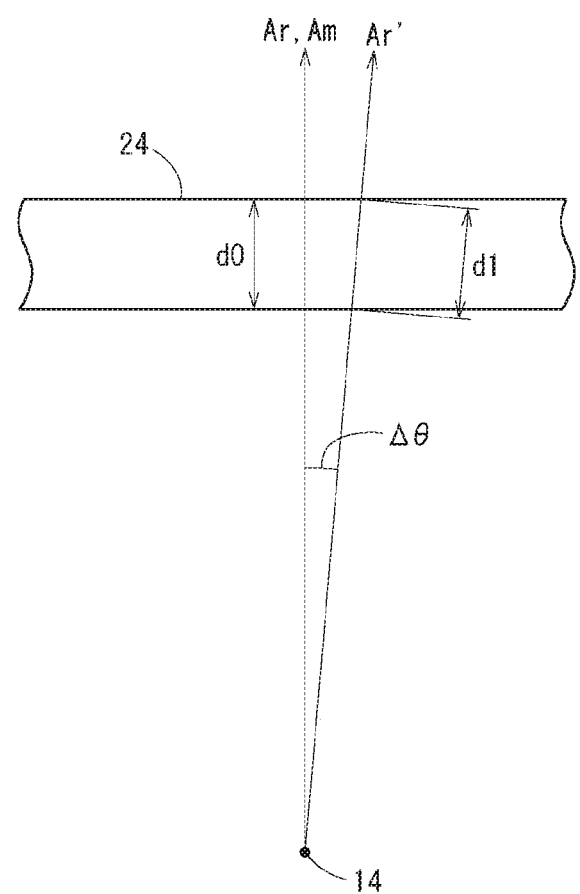
FIG. 7 is an explanatory view used to explain calculation of the amount of axial deviation and a transmittance correction value with respect to a radio wave transmissive member.

As the amount of axial deviation, an amount $\Delta\theta$ of axial deviation in an azimuth direction and an amount $\Delta\alpha$ of axial deviation (not shown) in an elevation angle direction with respect to the radar head 14 as an origin shown in FIG. 7 are calculated.

In step S3, the axial deviation amount calculation section 40 calculates an angle correction value. In this case, the axial deviation amount calculation section 40 sets, in the calibration section 44, the amount of axial deviation for correction in the azimuth direction (an azimuth angle correction value), that is, $-\Delta\theta$ and the amount of axial deviation for correction in the elevation angle direction (an elevation angle correction value), that is, $-\Delta\alpha$ on the basis of the calculated amount $\Delta\theta$ of axial deviation in the azimuth direction and the calculated amount $\Delta\alpha$ of axial deviation (not shown) in the elevation angle direction.

Figure 8:
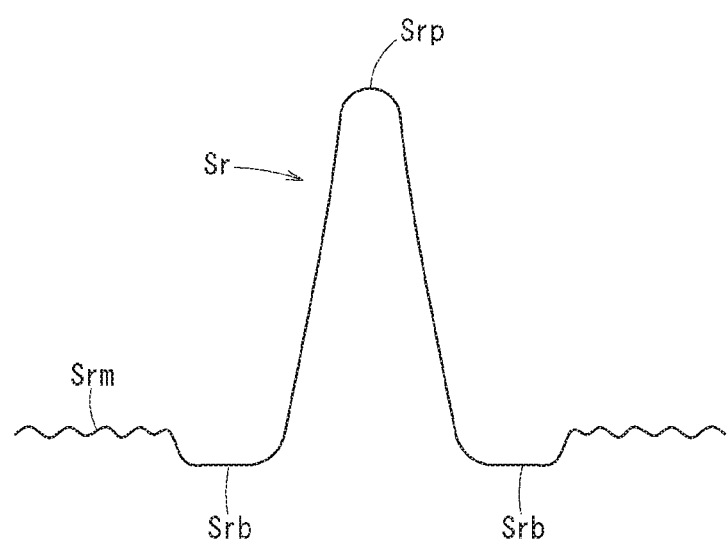
FIG. 8 is a waveform chart showing a reflected signal of a radar wave from each marker.

As shown in FIG. 8, with regard to level (strength) in a waveform indicating a reflected signal Sr of a radar wave from the marker 22, the level of a reflected signal Srp corresponding to the high radio-wave-reflecting member 35 is the maximum (peak), the level of reflected signals Srb corresponding to the radio wave absorption members 34 and 36 on two sides and constituting a leading edge and a trailing edge of the reflected signal Srp in the reflected signal Sr is the minimum (bottom), and the level of a reflected signal Srm corresponding to the radio wave transmissive member 24 around the radio wave absorption members 34 and 36 is slightly higher than that of the reflected signal Srb. The linear distances from the radio wave axis Ar' as the origin to the markers 22U, 22D, 22L, and 22R indicated by the circles (white circles) in FIG. 6 can be measured from the reflected signals Sr from the markers 22 even in a state with a high signal-to-noise (SN) ratio.

In step S4, the transmittance calculation section 42 calculates a transmittance correction value on the basis of the amount $\Delta\theta$ of axial deviation in the azimuth direction and the amount $\Delta\alpha$ of axial deviation in the elevation angle direction (not shown) and sets the transmittance correction value in the calibration section 44.

For example, if the thickness of the radio wave transmissive member 24 on the marker axis Am (the radio wave axis Ar before axial deviation) is d0, and the thickness of the radio wave transmissive member 24 on the radio wave axis Ar' after axial deviation is d1 (d0<d1), as shown in FIG. 7, the transmittance correction value (gain) is calculated as d1/d0. In actuality, a transmittance correction characteristic which covers the radar limit sensing range 32 is stored in advance in the memory, and transmittance can be calibrated by changing a read address.

Note that, if calculation of the amount of axial deviation of the radio wave axis Ar' is unsuccessful in step S2 or if the amount of axial deviation falls outside a range, within which calibration by the calibration section 44 is possible, the stop unit 43 stops the radar unit 12 (the azimuth-distance-speed calculation section 46) from detecting an object (target) to inhibit false detection.

[Summary of Embodiment and Modifications]

The vehicle 10 as a movable body according to the above-described embodiment includes the radar unit 12 as a surroundings detector and the marker 22 composed of the high radio-wave-reflecting member 35 (see FIG. 4). The radar unit 12 is attached to the frame 20 that is a predetermined part of the vehicle 10 and detects an object (target) present in a predetermined region around the vehicle 10 with the predetermined angle $\theta$ of field of view having the radio wave axis Ar as a center. The marker 22 is provided in front of the radar unit 12 as viewed from the radar unit 12 on the vehicle 10 and is provided to detect an axial deviation of the radio wave axis Ar of the radar unit 12 outside the radar field of view range 30 that is set based on the angle $\theta$ of field of view.

A relative position between the radar unit 12 and the marker 22 is different between before and after an axial deviation of the axis of the radar unit 12. An axial deviation (the amount $\Delta\theta$ of axial deviation in the azimuth direction and the amount $\Delta\alpha$ of axial deviation in the elevation angle direction) of the radio wave axis Ar of the radar unit 12 can be detected by obtaining a difference in marker detection position between before and after the axial deviation by the radar unit 12.

The vehicle 10 includes the radio wave transmissive member 24 that is attached to the vehicle body 11 that is in front of the radar unit 12 as viewed from the radar unit 12 and is a different predetermined part of the vehicle 10.

In this case, as shown in FIGS. 3 and 4, the marker field of view range 31 for the markers 22 is outside the radar field of view range 30 that is set based on the angle $\theta$ of field of view on the radio wave transmissive member 24 and inside the radar limit sensing range 32 of the radar unit 12.

For this reason, an axial deviation of the radio wave axis Ar of the radar unit 12 from the marker axis Am of the markers 22 can be detected by detecting the positions (see FIG. 6) of the markers 22, each composed of the high radio-wave-reflecting member 35 (see FIG. 4), by the radar unit 12.

Note that the four markers 22U, 22D, 22R, and 22L composed of the high radio-wave-reflecting members 35 are adopted as the markers 22. This allows more accurate calibration of an axial deviation of the radio wave axis Ar of the radar unit 12 on the basis of reflected signals from the markers 22U, 22D, 22R, and 22L.

Even in the case of a configuration provided only with the two left and right markers 22L and 22R or a configuration provided only with one marker 22L, calibration within a practically sufficient range is possible, for example, if the amount of axial deviation is small.

[Modifications]

If the camera 18 serves as a surroundings detector, markers constituting a quadrilateral may each be, for example, formed in black and white stripes within an image pickup range (field of view range) of the camera 18 on a front windshield.

Alternatively, each marker may be formed in stripes of colors in sharp contrast on a front hood (generally occupying about one-third of the image pickup range) above a front grille within the image pickup range (field of view range) of the camera 18 in view of the color of the front hood.

Note that, if the camera 18 serves as a surroundings detector, a lane marker or a vehicle in front can be detected even when the optical axis Ac deviates slightly. The front hood itself within the image pickup range (field of view range) may be treated as a marker, and detection of an object (target) may be stopped when the front hood that is about one-third of the image pickup range becomes not more than one-fifth or not less than one-half.

Note that the present disclosure is not limited to the embodiment and modifications described above and may be freely changed without departing from the scope of the present disclosure.

For example, a movable body is not limited to the vehicle 10 and can be applied to a ship, a flight vehicle, and the like.

The embodiment and modifications described above illustrate a configuration in which the radar unit 12 and the camera 18 are arranged on the front side of the vehicle 10 to detect an object in front of the vehicle 10. The present disclosure can also be applied to a case where the radar unit 12 and the camera 18 are arranged at each of sections to detect objects lateral to, behind, above, and below the vehicle 10 including objects oblique to the vehicle 10.

Additionally, the present disclosure is not limited to detection of a vehicle exterior and can also be applied to a case where the radar unit 12 and the camera 18 are arranged to detect a target object inside a vehicle interior. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A movable body comprising:
   a surroundings detector that is attached to a predetermined part of the movable body and detects an object present in a predetermined region around the movable body with a predetermined field of view angle having an axis as a center; and
   a marker that is provided to the movable body at a position located in front of the surroundings detector as viewed from the surroundings detector and is provided outside a field of view range set based on the field of view angle, the marker being used to detect an axial deviation of the axis of the surroundings detector, wherein
   the surroundings detector is a radar unit, and the axis is a radio wave axis,
   the movable body further includes a radio wave transmissive member that is attached in front of the radar unit as viewed from the radar unit,
   the marker includes a high radio-wave-reflecting member and is provided outside a field of view range of the radar unit set based on the field of view angle projected on the radio wave transmissive member and is provided within a limit sensing range of the radar unit, and
   the marker includes a plurality of markers that are provided on the radio wave transmissive member,
   wherein the plurality of markers are provided so as to surround the radio wave axis of the radar unit and to form a marker field of view,
   the movable body further comprising:
   an axial deviation amount calculation controller that calculates amount of axial deviation between the radio wave axis and a marker axis, the marker axis being a central axis of the marker field of view;
   a transmittance calculation controller that calculates transmittance of the radio wave transmissive member by using the amount of axial deviation between the marker axis and the radio wave axis; and
   a calibration controller that calibrates the amount of axial deviation of the radio wave axis, and calibrates the transmittance.

2. The movable body according to claim 1, wherein the radio wave transmissive member is a resin bumper or a resin grille.

3. The movable body according to claim 1, wherein the high radio-wave-reflecting member is made of a metal material disposed outside the field of view range.

4. The movable body according to claim 3, wherein the high radio-wave-reflecting member has an elongated strip line shape, and the marker includes radio wave absorption members that are provided on both sides of the line shape respectively as viewed from the radar unit.

5. The movable body according to claim 1, wherein the marker includes a plurality of markers that are provided on the radio wave transmissive member.

6. The movable body according to claim 1, further comprising:
   a stop controller that stops the radar unit from detecting the object when the amount of axial deviation cannot be calculated or when required calibration by the calibration controller falls outside a calibratable range.

7. The movable body according to claim 1, wherein
   the surroundings detector radiates a beam to detect the object and the axis is a beam axis,
   the marker includes a first member which reflects the radiated beam.

8. The movable body according to claim 7, wherein
   the marker includes a second member disposed adjacent to the first member and extending parallel to the first member, the second member having reflectivity for the radiated beam which is different from the reflectivity of the first member.

9. A method of detecting an axial deviation of an axis of a surroundings detector equipped with a movable body, wherein the movable body comprises:
   a surroundings detector that is attached to a predetermined part of the movable body and detects an object present in a predetermined region around the movable body with a predetermined field of view angle having an axis as a center; and
   a marker that is provided to the movable body at a position located in front of the surroundings detector as viewed from the surroundings detector and is provided outside a field of view range set based on the field of view angle, the marker being used to detect an axial deviation of the axis of the surroundings detector,
   wherein the surroundings detector is a radar unit, and the axis is a radio wave axis,
   the movable body further includes a radio wave transmissive member that is attached in front of the radar unit as viewed from the radar unit,
   the marker includes a high radio-wave-reflecting member and is provided outside a field of view range of the radar unit set based on the field of view angle projected on the radio wave transmissive member and is provided within a limit sensing range of the radar unit,
   the marker includes a plurality of markers that are provided on the radio wave transmissive member, and
   the plurality of markers are provided so as to surround the radio wave axis of the radar unit and to form a marker field of view,
   the method comprising steps of:
   calculating, by using a computer, amount of axial deviation between the radio wave axis and a marker axis, the marker axis being a central axis of the marker field of view;
   calculating, by using a computer, transmittance of the radio wave transmissive member by using the amount of axial deviation between the marker axis and the radio wave axis; and
   calibrating, by using a computer, the amount of axial deviation of the radio wave axis, and calibrating the transmittance.

* * * * *